July 31, 1945.  J. B. McFADDEN  2,380,856
HOMOGENIZER
Filed Feb. 18, 1943  2 Sheets-Sheet 1

Inventor
James B. McFadden
By Mason, Porter & Diller
Attorneys

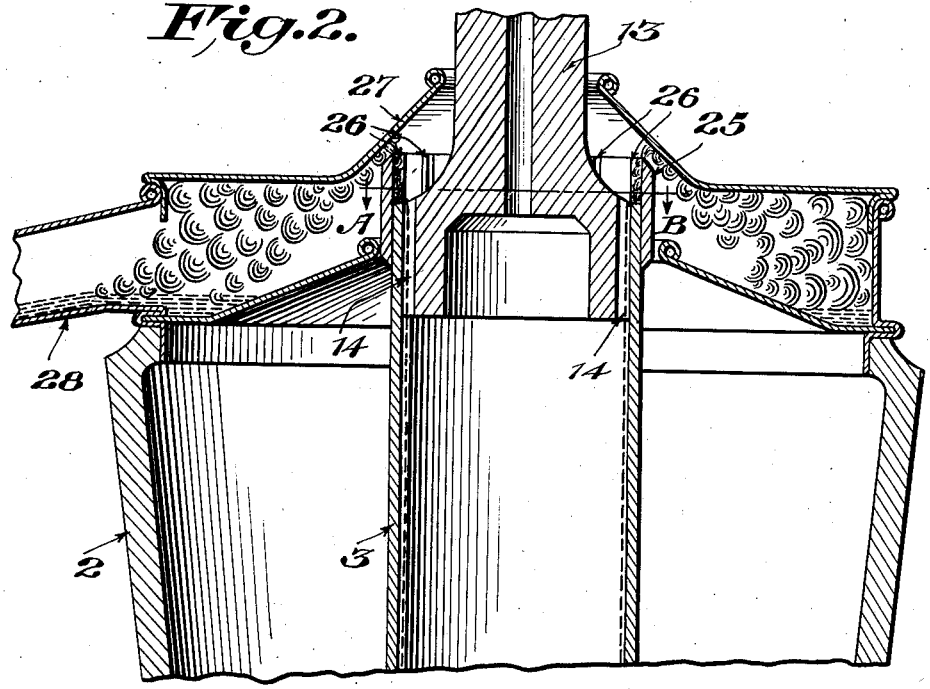
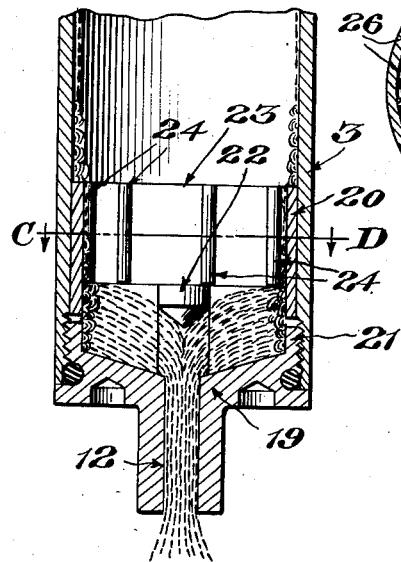
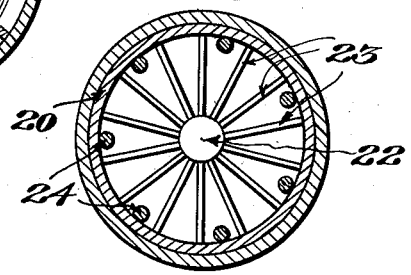

Patented July 31, 1945

2,380,856

UNITED STATES PATENT OFFICE 2,380,856

HOMOGENIZER

James B. McFadden, West Chester, Pa., assignor to United Dairy Equipment Company, West Chester, Pa., a corporation of Pennsylvania Application February 18, 1943, Serial No. 476,347

4 Claims. (Cl. 259—96)

The invention relates to new and useful improvements in a homogenizer of the type shown in the patent granted Walter G. Dixon, June 28, 1921, No. 1,382,765, wherein the liquid ingredients are homogenized by impacting the same by centrifugal force against a hard moving surface after which they are moved along said surface for clarifying the same.

An object of the invention is to provide a homogenizer of the above type with means for further impacting the ingredients after clarification for perfecting the homogenization of the product.

A further object of the invention is to provide a homogenizer of the above type with means whereby the liquid ingredients being impacted against the rotating wall are caused to rotate with the wall and are then again impacted by centrifugal force against the bowl wall, all of which takes place before clarification.

A still further object is to provide a homogenizer of the above type wherein the homogenizing bowl is provided at its receiving end with a surface of lesser diameter than the inner diameter of the bowl against which the liquid ingredients are impacted by centrifugal force and wherein said bowl at its discharge end is provided with a surface of greater diameter than the diameter of the bowl against which the material is impacted by centrifugal force as it is discharged from the bowl for further perfecting the homogenization of the product.

Another object of the invention is to provide a homogenizing bowl of the above type wherein the product is impacted directly against a stationary surface for the final and complete homogenization of the product.

These and other objects will in part be obvious and will in part be hereinafter more fully described.

In the drawings, which show by way of illustration one embodiment of the invention, Figure 1 is a view of a homogenizing machine embodying the improvements, said view being partly in side elevation and partly in vertical section.

Figure 2 is an enlarged vertical sectional view through the upper end of the homogenizing bowl and the casing surrounding the same.

Figure 3 is an enlarged vertical sectional view through the lower end of the homogenizing bowl.

Figure 4 is a sectional view on the line A—B of Fig. 2.

Figure 5 is a sectional view on the line C—D of Fig. 3.

Figure 1:
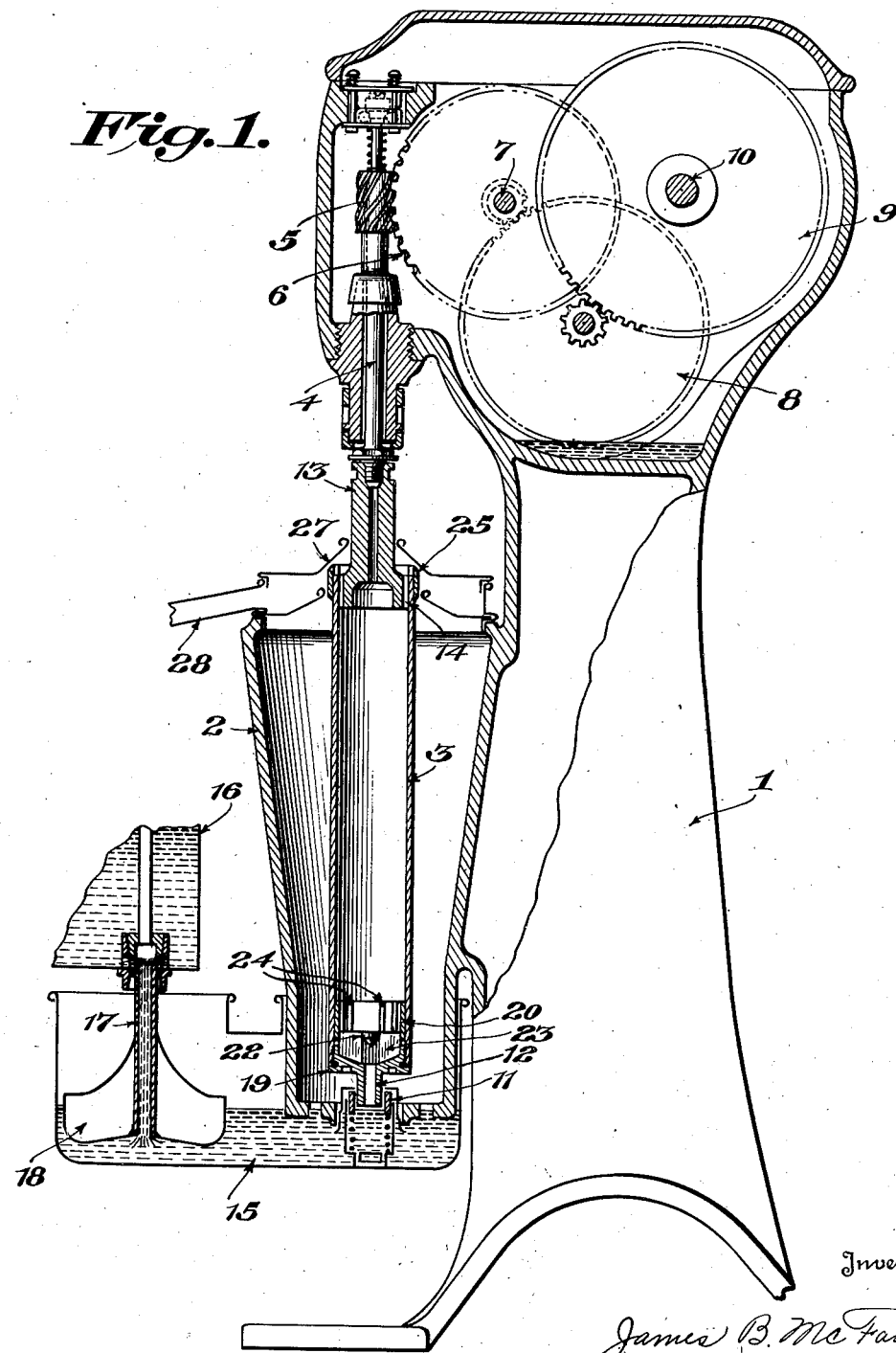

Referring to Figure 1 of the drawings, the homogenizing machine includes a supporting frame structure 1. Formed integral with said supporting frame is a bowl casing 2 in which is mounted for rotation a homogenizing bowl 3. This homogenizing bowl is supported and rotated by a spindle 4 mounted in suitable bearings in the frame. The spindle carries a worm gear 5 which meshes with a gear 6 mounted on a shaft 7. The gear 6 is rotated by a gear 8 and the gear 8 is in turn rotated by a gear 9. The gear 9 is carried by a shaft 10 which is rotated by any suitable mechanism. The purpose of the gears is to multiply the speed so that the spindle will be rotated very rapidly. The bowl is supported entirely by the spindle and is merely guided at its lower end in a ring 11. All of the parts mentioned are of the usual construction, and further detailed description thereof is not thought necessary.

The bowl at its lower end is provided with a receiving opening 12. The lower end of the bowl is closed, except for this receiving opening. The upper end of the bowl is closed by a supporting head 13 and there are a plurality of discharge openings 14 formed through this head, which discharge openings are located in alignment with the inner surface of the wall of the bowl. These discharge openings are so positioned relative to the inlet opening 12 that the ingredients to be homogenized are sucked into the bowl through the bottom inlet, forced outwardly by centrifugal force into contact with the inner parts of the bowl, moved along the inner wall of the bowl and discharged through the outlet openings 14.

Referring again to Fig. 1, there is a feed cup 15 associated with the lower end of the casing 2. The liquid ingredients to be homogenized hereinafter referred to as the mix are fed from a main mixing tank 16 through a control valve 17 carried by a float 18.

The ingredients to be homogenized are placed in the mixing tank and thoroughly mixed. They are also heated so as to facilitate the homogenization of the same. The purpose of this float controlled valve is to maintain a substantially constant level of the mixed ingredients in the feed cup, regardless of the head maintained on the mixing tank. This enables the bowl as it rotates to draw in by suction a uniform amount of the mix to be homogenized determined by the speed of the bowl.

The bottom end of the bowl 3 is closed by a bottom head 19 and the inlet opening 12 is located centrally of this head. This opening is dimensioned so that it is spaced away from the wall of the bowl. The bottom head has a threaded connection with the bowl and can be easily removed for the purpose of cleaning the interior of the bowl.

Located within the bowl is a sleeve 20 which is fixed to and rotates with the bowl. The bottom head is recessed so as to provide a cylindrical wall 21 which is in alignment with the inner wall of the sleeve 20.

Disposed centrally of the bowl and directly in alignment with the inlet 12 is a spreader head 22. This spreader head has a cone-shaped lower surface, the side walls of which are substantially at an angle of 60° to the axis of the bowl. The diameter of this spreader head is slightly greater than the inlet opening 12. Extending radially from this spreader head 22 is a plurality of blades 23. As shown, there are fourteen blades. This number may be increased or may be decreased. It is desirable, however, that there shall be a sufficient number of blades in order to divide the mix to be homogenized into separated streams which are impacted by centrifugal force against the cylindrical wall 21, and the lower portion of the cylindrical surface of the sleeve 20. These blades are attached to the bowl and support the spreader head so that the spreader head and the blades rotate at the same speed as the bowl. The blades will dash against the ingredients in the mix to be homogenized and violently force the same outward along their impelling surfaces and impact the same against the cylindrical walls mentioned with a terrific force.

Following this impact action of the mix against the surface of the bottom head and the sleeve 20 the mix will be filmed and caused to move upwardly along the inner surface of said sleeve 20. Mounted on this inner surface of the sleeve are spaced ribs 24. The ribs are parallel with the axis of the bowl and serve to cause the film moving along the surface to rotate at the same speed as the bowl.

The inner surface of the sleeve 20 is of less diameter than the inner diameter of the bowl and the mix will be forced by centrifugal force over the edge of the sleeve and impacted against the wall of the bowl. This results in a further homogenizing of the ingredients of the mix. Following this impacting of the mix against the wall of the bowl, the mix will be caused to flow upwardly along the wall of the bowl to the discharge outlet openings 14. During this movement of the mix along the bowl wall, which is of considerable length, the flowing film will be subject to a terrific centrifugal force which will cause the heavy foreign particles to be separated from the mix and adhere to the bowl wall. The mix flows over the adhering foreign particles and is discharged through the openings 14. This separation of the foreign particles from the mix may be referred to as clarifying the mix.

The outlet openings 14 are of sufficient size so as to permit the mix to flow freely therethrough without any particular squeezing action thereon, and therefore the likelihood of clogging the flow of the mix through the homogenizer is reduced to a minimum. The openings, however, are as noted above, of sufficient size relative to the inlet opening at the bottom of the bowl so as to produce a suction which draws the mix into the bowl.

Attached to the outer surface of the bowl 3 is a sleeve 25 which projects beyond the end of the bowl. The inner surface of this sleeve is disposed outwardly from the inner surface of the bowl. As these separated streams of the mix leave the inner bowl surface, they are impacted against the inner surface of the sleeve 25. The rupturing effect upon the mix due to this impacting action is even more severe than that encountered at the bottom of the bowl wall owing to the fact that the inner surface of the sleeve 25 is of greater diameter than the diameter of the bowl and the diameter of the inner sleeve 20. The centrifugal force, therefore, acting to impact the mix against this sleeve 25 is greater.

Mounted on the inner surface of the sleeve 25 is a plurality of spaced ribs 26. The mix which is impacted against the inner surface of the sleeve 25 will form into a film and flow upwardly on said wall and will be caused to rotate by these ribs at the same speed as the bowl. The mix is then forced over the upper edge of the sleeve 25 and against the receiving pan 27 which is very closely spaced from the upper edge of the rotating bowl, and here again, is a further impacting action.

Owing to the fact that the pan is stationary and close to the edge of the bowl, the mix will move along the pan with vigorously impelling force, which through the frictional drag of the pan on the globules of the mix adds to the homogenizing effect of this final impacting action against the pan.

From the above it will be noted that the improved homogenizer includes means for producing a homogenizing effect on the ingredients as they enter the bowl after which the homogenized product is clarified and is then again subjected to a homogenizing effect which produces a product wherein the ingredients are thoroughly homogenized and the homogenization of the same is fixed. Any tendency of the centrifugal force operating upon the flowing mix during clarification of the same to break down the homogenization by the separating of the lighter particles from the heavy in the mix is re-established in this final homogenizing action which takes place when the mix leaves the bowl and is discharged against the pan. The receiving pan is fitted with a spout 28 and the homogenized product flows through the spout onto a surface where the mix is cooled to the desired temperature for immediate use or storing. Attention is called to the fact that there are a plurality of impacting devices at the receiving end of the bowl which operate in succession, and between the impacting devices is a means for insuring that the mix shall rotate with the bowl and at the same speed as the bowl. These are the ribs 24 in Figure 3. Attention is also called to the fact that there is provided a plurality of impacting devices at the discharge end of the bowl and they operate in succession upon the mix. Likewise, between these impacting devices at the discharge end of the bowl are ribs which insure that the mix shall rotate with the bowl and at the same speed as the bowl.

It is further to be noted that the impacting of the mix at the discharge end of the bowl follows the impacting of the mix at the receiving end of the bowl and as the mix passes from one impacting device to another, the film of mix is thinned out owing to the increasing of the diameters over which impacting takes place and the centrifugal force acting on the mix increases with the successive impacts imparted to the mix. This is of particular value when operating upon oily substances as the globules will be torn into smaller parts and impacted and so on, until the globules of oil substances are torn to bits and suspended in the emulsion.

The improved homogenizing bowl is particularly adapted for the homogenizing of oily substances and watery products, such as skimmed milk powder (de-hydrated skimmed milk), fresh unsalted butter and water, which ingredients when properly proportioned and thoroughly homogenized produce a product having all of the characteristics of natural whole milk or natural cream. The action of the homogenizer on such a mix will be briefly described. The ingredients to be homogenized are placed in the mixing tank and are heated, preferably to a temperature sufficient to pasteurize the mix and to expand or rarefy the butter-fat globules constituting the butter content of the mix into such increased internal pressure form that whatever welding tendency exists to hold them together will be broken up and thus perimt them to be dispersed and evenly distributed under agitation through the main body of the mix. The mix then passes through the valve into the feed cup, and the valve is so constructed and operated as to maintain a fixed level of the mix in the feed cup regardless of the head in the mixing tank. The mix is sucked from the feed cup into the homogenizing bowl by means of a partial vacuum created by the outlet openings 14 at the upper end of the bowl. When the mix is sucked into the bowl through the inlet opening 12, it contacts with the spreader head 22 and is directed outwardly between the blades 23. The blades are rapidly rotating and will dash against the mix and violently force it outwardly along their impelling surfaces and impact it against the peripheral wall of the sleeve 20 and the inner peripheral surface of the bottom head. This movement of the butter-fat globules along the impeller blades produces a scraping action thereon by reason of the frictional resistance to the movement of the particles along the blades. The expansion of the butter-fat globules because of the heat weakens their resistance to rupture and this tearing action on the globules as they move along the impelling blades and the impacting of the globules against the walls of the bowl rupture the same, and this is the beginning of the homogenizing action which takes place in the homogenizing bowl. The butter-fat globules in the mix will then move along the inner surface of the sleeve 20 and will by centrifugal force be scraped off of the edge of the sleeve and impacted against the inner surface of the bowl directly above the sleeve 20.

Again there is a further homogenizing action upon the mix. The mix then flows along the inner wall of the bowl where centrifugal force operates on the same, separates the heavy foreign particles, causing them to adhere against the wall of the bowl, and thus the mix is clarified. As the mix passes through the discharge openings 14, there is no squeezing action on the globules as is usually practiced in the homogenizing of milk products, but the milk streams will flow freely without clogging. As the mix is discharged from the outer ends of these openings 14, it will be impacted against the inner wall of the sleeve 25. At this time the mix is in stream form and the globules will be impacted against each other and against the wall and will be scraped and torn as they pass over the edge of the bowl. This, together with the fact that there is increased centrifugal force acting thereupon, produces a very efficient homogenizing effect upon the product.

Then again, as the fat globules in the mix are impacted against the stationary pan the further rupturing of the globules is effected, resulting in a homogenized product which is of a fixed nature. The completely homogenized and cooled product thus produced, while having all the characteristic features of natural milk, has an even finer taste and texture, and better keeping qualities than natural milk. It also has the additional non-separating and sanitary features not present in natural milk.

The same ingredients as above referred to for making a milk product may also be used for making ice cream mix, with the addition of sugar, gelatine, etc. While the invention is particularly adapted for the homogenizing of ingredients to produce a milk product, it will also be understood that from certain aspects of the invention the emulsifier may be used for homogenizing any oily substance and watery product. It is also obvious that many changes may be made in the details of construction without departing from the spirit of the invention as set forth in the appended claims.

I claim:

1. A homogenizer including in combination a rotary closed bowl having an inlet at its lower end arranged centrally thereof and outlet openings at the upper end thereof which are positioned further from the axis of rotation of the bowl than the inlet, said bowl having a sleeve located within its lower end, a spreader head located in the bowl in alignment with the inlet opening and having a tapered underface for directing the mixed ingredients outwardly toward the wall of the sleeve and radially disposed blades attached to and rotating with the bowl for impacting said mixed ingredients against the wall of the sleeve and causing the same to flow upwardly along the surface thereof, and spaced ribs mounted on said sleeve for causing the flowing ingredients to rotate at the same speed as the bowl, whereby centrifugal force will scrape said ingredients over the edge of the sleeve and impact the same against the wall of the bowl.

2. A homogenizer including in combination a rotary closed bowl having an inlet at its lower end arranged centrally thereof and outlet openings at the upper end thereof which are positioned further from the axis of rotation of the bowl than the inlet, said bowl having a sleeve located at the receiving end, spaced ribs mounted on said sleeve disposed so as to cause the flowing ingredients to rotate at the same speed as the bowl, means for directing the ingredients from the inlet opening onto said sleeve whereby said ingredients when leaving the sleeve will be impacted against the wall of the bowl, and means at the discharge end of the bowl for impacting the mixed ingredients against a wall carried by the bowl, the wall of the bowl between the inlet and the outlet openings being of sufficient length so that centrifugal force acting on the film of ingredients flowing along said wall will clarify the same.

3. A homogenizer including in combination a rotary closed bowl having an inlet at its lower end arranged centrally thereof and outlet openings at the upper end thereof which are positioned further from the axis of rotation of the bowl than the inlet, said bowl having a sleeve located at the receiving end, spaced ribs mounted on said sleeve disposed so as to cause the flowing ingredients to rotate at the same speed as the bowl, means for directing the ingredients from the inlet opening onto said sleeve whereby said ingredients when leaving the sleeve will be impacted against the wall of the bowl, and a sleeve mounted on the outer side of said bowl at the upper end thereof and projecting beyond said upper end so that the mixed discharge from the outlet openings in the bowl will be impacted against the wall of said sleeve, the wall of the bowl between the inlet and outlet opening being of sufficient length so that centrifugal force acting on the film of ingredients flowing along said wall will be clarified.

4. A homogenizer including in combination a rotary closed bowl having an inlet at its lower end arranged centrally thereof and outlet openings at the upper end thereof which are positioned further from the axis of rotation of the bowl than the inlet, said bowl having at the receiving end thereof lower homogenizing means including a plurality of radially spaced surfaces successively of larger diameter against which the mixed ingredients are impacted in succession by centrifugal force and at the discharge end of the bowl upper homogenizing means including a plurality of radially spaced surfaces successively of larger diameter and each of which is of larger diameter than the first-named surfaces, against which the mixed ingredients are impacted in succession by centrifugal force as the ingredients leave the bowl, the upper and lower homogenizing means being spaced from each other longitudinally of the bowl, whereby the mixed ingredients are permitted to spread out after impact before being released and impacted against the surfaces of the upper homogenizing means, said bowl between the inlet and outlet openings being of sufficient length so that the centrifugal force acing on the film of ingredients flowing along said wall will clarify the same.

JAMES BENEDICT McFADDEN.